United States Patent [19]

Meccariello

[11] Patent Number: 4,980,905

[45] Date of Patent: Dec. 25, 1990

[54] X-RAY IMAGING APPARATUS DOSE CALIBRATION METHOD

[75] Inventor: Thomas V. Meccariello, Eagle, Wis.

[73] Assignee: General Electric Company, Milwaukee, Wis.

[21] Appl. No.: 311,726

[22] Filed: Feb. 16, 1989

[51] Int. Cl.[5] ........................ G01D 18/00; H05G 1/38; H05G 1/44; H05G 1/34

[52] U.S. Cl. ........................................ 378/207; 378/96; 378/97; 378/108; 378/110

[58] Field of Search .................... 378/97, 99, 112, 108, 378/95, 207, 109

[56] References Cited

U.S. PATENT DOCUMENTS

| | | | |
|---|---|---|---|
| 3,783,286 | 1/1974 | Kremer | 378/98 |
| 4,309,613 | 1/1982 | Brunn et al. | 250/409 |
| 4,423,521 | 12/1983 | Haendle et al. | 398/108 |
| 4,454,606 | 6/1984 | Relihan | 378/97 |
| 4,573,183 | 2/1986 | Relihan | 378/108 |
| 4,590,603 | 5/1986 | Relihan et al. | 378/108 |
| 4,703,496 | 10/1987 | Meccariello et al. | 378/99 |
| 4,797,905 | 1/1989 | Ochmann et al. | 378/110 |
| 4,809,309 | 2/1989 | Beekmans | 378/99 |

*Primary Examiner*—Janice A. Howell
*Assistant Examiner*—Don Wong
*Attorney, Agent, or Firm*—Quarles & Brady

[57] ABSTRACT

An X-ray imaging system includes an X-ray tube which emits X-rays that are converted to visible light image by an image intensifier. This system can be operated in either a fluoroscopic mode in which the visible light image is viewed by a video camera and displayed on a monitor, or a film camera mode in which the visible light image is recorded on film. The X-ray system is calibrated for a selected fluoroscopic dose rate by producing an exposure and sensing the current through a photocathode of the image intensifier. The actual dose rate is derived from the sensed photocathode current. The excitation of the X-ray tube is the adjusted until the actual dose rate is within a given tolerance range of the selected dose rate. The system parameters are then stored for use when the same dose rate is selected again. Parameters for other selectable fluoroscopic dose rates are calculated from the stored parameters. The dose rates for the film camera mode then are calibrated using a fluoroscopic mode exposure.

20 Claims, 2 Drawing Sheets

X-RAY IMAGING APPARATUS DOSE CALIBRATION METHOD

BACKGROUND OF THE INVENTION

The present invention relates to X-ray imaging equipment, and particularly to techniques for calibrating the dose rate of the X-rays emitted by this equipment.

Medical diagnostic X-ray imaging commonly involves fluoroscopic examination of a patient, such as during a catherization procedure. For this application the X-rays transmitted through the patient are converted to a visible light output image by an image intensifier tube. The output image is viewed by a video camera and displayed by a monitor enabling the medical personnel to observe the patient in real-time. The fluoroscopic image sequence can be simultaneously recorded on magnetic tape.

In the fluoroscopic mode, the X-ray exposure extends for a relatively long duration. As a consequence, the X-ray dose rate, and hence the X-ray tube current, must be maintained relatively low. U.S. government regulations require that during fluoroscopy, the dose rate shall not exceed ten Roentgens per minute (10 R/min.) at the plane where the X-ray beam enters the patient.

When fluoroscopy is not required the same X-ray equipment can be used to record images on a photographic medium. In this application the output of the image intensifier tube is recorded using a cine or photospot film camera. The X-ray emission in this mode of operation is pulsed to expose each frame of the film.

Regardless of the mode of operation, fluoroscopic or film, the equipment uses an automatic brightness control (ABC) system which regulates the X-ray emission to maintain the light output from the image intensifier at a substantially constant level. It should be noted that due to the different light sensitivities between the video and film cameras, the different modes of operation require different intensity levels of the output image. This control system insures readable images and are produced despite variation in the density of different portions of the patient's body which move into the exposure. U.S. Pat. No. 4,703,496 discloses one type of an automatic brightness control system.

In the fluoroscopy mode, the control system monitors the luminance of the video image as an indicator of the image intensifier's light output intensity (brightness). In the cine or photospot camera modes, a photodetector directly senses the light output from the image intensifier. The automatic brightness control system regulates the X-ray tube anode to cathode current, the anode to cathode voltage (KV) and the size of the camera apertures to maintain the level of light entering the respective camera substantially constant. However this regulation process is complicated by the interaction of these tube excitation parameters. The anode-to-cathode current is a function of primarily the cathode (or filament) temperature, while a constant voltage is applied across the anode and cathode. Although X-ray intensity and hence the image brightness, are directly proportional to the anode-to-cathode current, a non-linear relationship exists between the X-ray intensity and the anode-to-cathode voltage.

Previous brightness control systems, such as disclosed in the patent cited above, adjusted the excitation parameters on a priority basis. Initially the tube anode-to-cathode current is varied to keep the output light level constant. If that fails to maintain a constant image intensity or when further variation would exceed the maximum permitted dose rate, the voltage is adjusted. As a last resort the camera's iris aperture is opened to transmit more light to the camera. In addition in the fluoroscopic mode the video camera gain can be increased, but this has the negative side effect of increasing signal noise as well.

Before the X-ray system can be placed in operation, it must be calibrated for each selectable dose rate to account for variations in the characteristics of system components, such as the image intensifier, the video camera, and the X-ray tube. Previously, the calibration process involved placing a dosimeter in the plane at which the X-ray beam enters the patient. The X-ray equipment was then operated in the fluoroscopic mode at a selected dose rate. The camera's iris was manually adjusted until the control loop produced the selected dose rate as indicated by the dosimeter. This process was repeated for each selectable fluoroscopic dose rate. A similar manual calibration procedure was used to calibrate the brightness control loop for the cine or photospot camera operating modes.

SUMMARY OF THE INVENTION

A general object of the present invention is to provide a method and apparatus for automatically calibrating the selectable dose rates from an X-ray imaging system.

A more specific object is to accomplish the calibration without the use of a separate dosimeter. For example, this object is accomplished by using the photocathode current of an image intensifier in the X-ray system as an indicator of the X-ray dose level.

Another object is to perform the calibration process for one of the selectable dose rates, and from the results of that calibration, calculate the calibrated parameters for other selectable dose rates.

A further objective of the present invention is to employ the calibration of the fluoroscopic operation mode to establish the exposure parameters and calibrate the circuitry for the film camera operating modes.

DETAILED DESCRIPTION OF THE INVENTION

Figure 1:
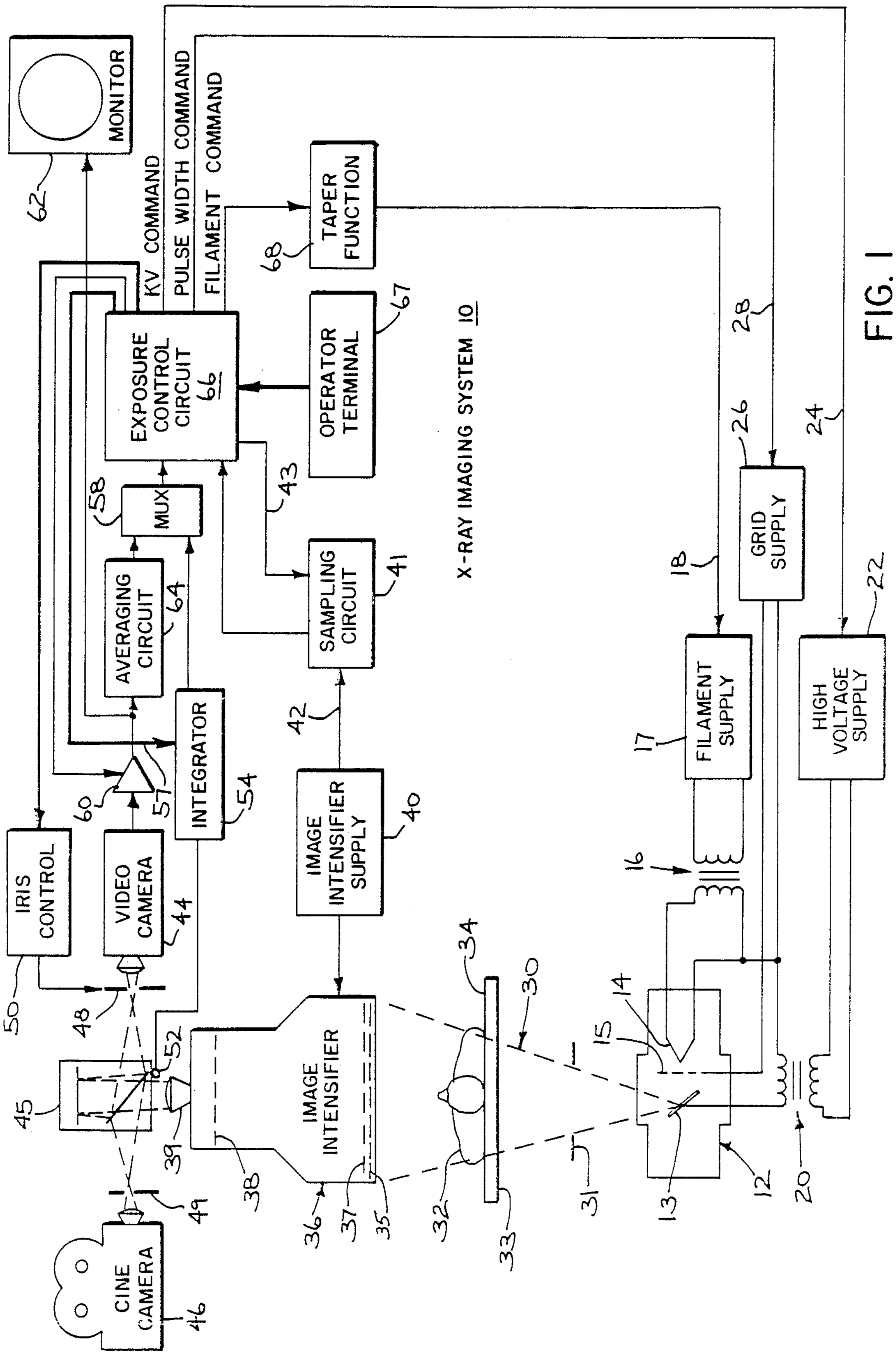
FIG. 1 is a block schematic diagram of an X-ray system which incorporates the present intention.

FIG. 1 illustrates the functional components of a combined X-ray cinerecording and fluoroscopy imaging system 10. The system incorporates a conventional X-ray tube 12 having a rotating anode 13, a combined cathode/filament 14 and a control grid 15. The filament current is supplied by a filament transformer 16 driven by a conventional power supply 17. The filament power supply 17 regulates the current furnished to the primary winding of the filament transformer 16 in response to a control signal on line 18. A high voltage step-up transformer 20 has a secondary winding coupled between the anode 13 and the cathode/filament 14 to provide high voltage bias to these electrodes. The primary winding of the step-up transformer 20 is connected to the output of a standard high voltage power supply 22, which is controlled in a conventional manner by a signal on line 24, designated KV COMMAND. The control grid 15 is biased by a grid power supply 26 in response to a signal, designated PULSE WIDTH COMMAND, on line 28. This signal defines the duration of each X-ray pulse When properly excited, the X-ray tube 12 emits a beam of X-rays as depicted by the pair of dashed lines 30. A shutter 31 is manually adjusted during system set-up to define the shape of beam 30. As illustrated in FIG. 1 the X-ray tube 12 is positioned beneath a patient 32 lying on a table 33 which is transparent to the X-ray beam 30.

A conventional X-ray image intensifier 36 is positioned to receive the X-rays which pass through the patient 32. The image intensifier includes an X-ray sensitive input phosphor screen 35, a photocathode 37 and an output phosphor screen 38. The impingement of X-rays on the input phosphor screen 35 generates visible light which is directed toward the photocathode 37. This light causes the photocathode 37 to emit electrons which are amplified by an electron multiplier (not shown) in the intensifier 36. The electrons from the multiplier strike the output phosphor screen 38 generating a visible light output image which is projected by a lens 39. A power supply 40 furnishes electrical power to the image intensifier 36 and provides a signal on line 42 indicative of the intensifier photocathode current level. The photocathode current is periodically sampled and filtered by a sampling circuit 41 in response to control signals on line 43.

The output image from the image intensifier 36 is projected by lens 39 into a beam splitter 45 which divides the projected light into two parts. One part is directed to a video camera 44 and the other part is directed to a cinecamera 46. A fixed iris 49 is located in front of the cinecamera 46 and a variable iris 48, controlled by a signal from an iris control circuit 50, is in front of the video camera 44. The exposure control circuit 66 contains a video gain and aperture control circuit similar to the one used in the brightness control in the aforementioned U.S. patent, which is incorporated by reference herein. The video gain and aperture control circuit sends control commands to the iris control 50 which specify the size of the iris aperture. The iris control 50 responds to these commands by altering the aperture size of iris 48, accordingly.

The video signal from camera 44 is amplified by a variable gain amplifier 60, which also is controlled by a signal from the video gain and aperture circuit of the exposure control circuit 66. The amplified video signal is displayed on monitor 62 for viewing by medical personnel. The output signal from the amplifier 60 also is coupled to an averaging circuit 64 which produces an output indicative of the average image brightness level of each video frame. The details of the brightness averaging circuit are disclosed in U.S. Pat. No. 4,573,183, which is incorporated by reference herein. Such a circuit averages the luminance component of the video signal. The average brightness indication signal is fed to one input of a two-to-one multiplexer 58.

A photodetector 52 is positioned at the edge of the output light beam from the image intensifier 36 to sense the intensity of the light. This sensor produces an output signal that is directly proportional to its input light intensity. The sensed light intensity is integrated over the X-ray pulse period by an integrator 54. The signal gain of an amplifier at the input of the integrator 54 is set by a signal from the image control bus 57, as will be described. The output of the integrator 54 is coupled to the other input of multiplexer 58. Depending upon the mode of system operation, the multiplexer couples either the output of the averaging circuit 64 or the output of the integrator 54 to the exposure control circuit.

As noted in the description of the X-ray system 10 thus far, many of the components respond to control signals, which emanate from an exposure control circuit 66. Specifically, the control circuit regulates the X-ray tube emission by three signals designated FILAMENT COMMAND, KV COMMAND and PULSE WIDTH COMMAND which control the filament supply 17, high voltage supply 22 and grid supply 26 respectively. The FILAMENT COMMAND signal is processed by standard taper function circuit 68 which is connected by line 18 to the filament supply 17. The taper function circuit insures that the X-ray dose at the plane of the upper surface 34 of the table 33 does not exceed the limit of 10 R/min during fluoroscopy.

The exposure control circuit 66 receives the output of multiplexer 58 and the photocathode current level samples from sampling circuit 41. The sampling circuit control signals on line 43 emanate from the exposure control circuit. The exposure control circuit 66 also receives input commands from an operator terminal 67. This terminal 67 permits the operator to choose the mode of operation (fluoroscopic or film) and select among a group of predefined dose rates for an X-ray exposure. The operator terminal also provides a visual indication of different operating parameters of the X-ray system 10.

Although a hardwired control circuit, similar to the one disclosed in U.S. Pat. No. 4,703,496 can be used, the exposure control circuit 66 is preferably a microcomputer based subsystem. As such, it contains a memory for storing the automatic brightness control program along with variables and constants used during the execution of the program. It would be readily apparent to one skilled in the art, how to implement the concepts disclosed in the patent cited immediately above in the software program.

When the X-ray system 10 is in the fluoroscopic operating mode, the average brightness of each field of the video signal from camera 44 is measured by the averaging circuit 64. The exposure control circuit 66 receives the average brightness indication from circuit 64 via multiplexer 58. In response to the average brightness indication, the exposure control circuit 66 issues the KV COMMAND and the FILAMENT COMMAND to alter the X-ray tube excitation in order to maintain the brightness of the output image substantially constant. Minor variations in the output image brightness will not produce a change in the X-ray tube excitation. The brightness of the output image is also controlled by the aperture size of the video camera iris 48 and the gain of the video amplifier 60. The functioning of the automatic brightness control loop is similar to the method described in U.S. Pat. No. 4,703,496.

Similarly, when the X-ray system 10 is in the cinecamera mode, the exposure control circuit 66 also regulates the X-ray emission to maintain the output image of the image intensifier 36 at a constant brightness. Because the film is exposed by the light output of the image intensifier, the intensity of this light instead of the average video level from the video camera is used to control the image brightness. To accomplish this control, the photodetector 52 senses the light intensity of the output image in the cinecamera mode. The sensed image brightness is integrated over the film frame period by integrator 54 and coupled by multiplexer 58 to the input of exposure control circuit 66. This image brightness input is used to control the X-ray tube excitation, as in the fluoroscopy mode, to produce a constant brightness level of the output image.

In order for the exposure control circuit 66 to perform its function, it must be initially calibrated for the specific characteristics of the system components. For example, each X-ray tube 12 and image intensifier 36 will have a unique set of performance characteristics which will affect the operation of the brightness control. Therefore prior to initial operation of the X-ray system 10 and when components are replaced thereafter, the dose rates of the system must be calibrated using the following technique.

Figure 2:
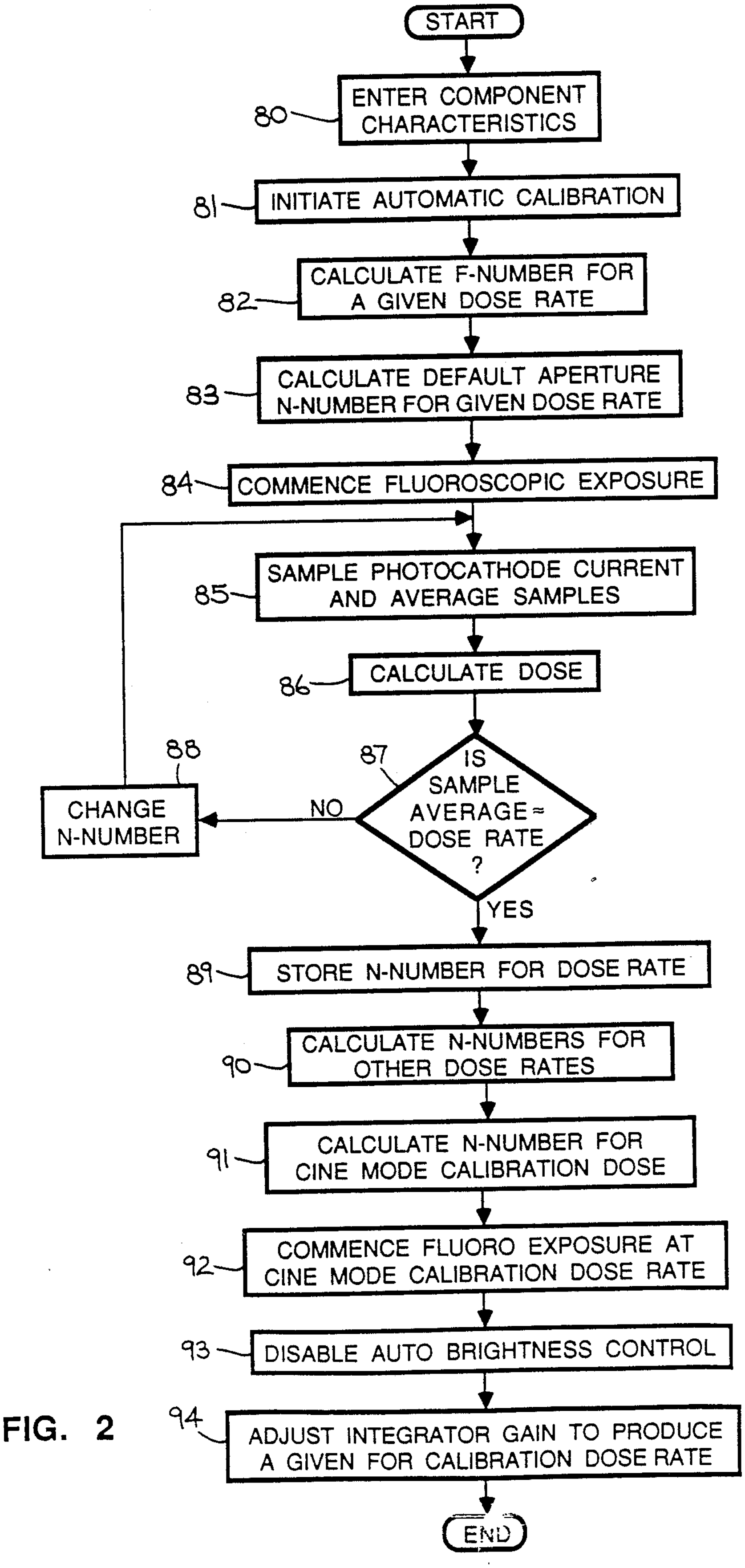
FIG. 2 depicts a flowchart of the instant calibration technique.

At the outset of the system calibration procedure at step 80 of FIG. 2, the technician enters the characteristics of the particular image intensifier 36 into the operator terminal 67. These characteristics are stored in the memory of the exposure control circuit 66. One of these characteristics is the image intensifier X-ray input intensity to visible light output intensity conversion factor, which characterizes the efficiency of the intensifier 36. Another parameter of the image intensifier that is entered into the system 10 is the photocathode current gain, which characterizes the linear relationship between the photocathode current and the X-ray input dose. Both of these characteristics are determined by measuring the performance of the particular image intensifier 36 in a test fixture prior to assembly in the X-ray imaging system 10. Similarly, the previously measured sensitivity of the pickup tube in the video camera 44 is entered into the exposure control circuit memory. Other system parameters, which are necessary for the computations described hereinafter, are also entered at this time.

Once the characteristics of the system components have been entered, the system is placed in the automatic calibration state. The first operation therein is to calculate and store default fluoroscopic mode iris aperture settings for each selectable dose rate. Conventionally, iris aperture sizes are defined by a series of f-numbers, or f-stops. Each f-number represents a fifty percent reduction in the size of the aperture from the previous f-number in the ascending numerical series. However, this is too large an incremental change for the X-ray system. As a result, a set of finer gradations in aperture size is defined, which are referred to as "N-numbers". Each N-number defines a step in the iris aperture size with each successive step being a ten percent decrease in the size of the preceding step. That is, each successive ascending N-number step decreases the aperture size to ninety percent of the size of the preceding N-number step. For example, an N-number of one corresponds to an aperture closed down to ninety percent of the wide open area. An N-number of two corresponds to an aperture closed down to ninety percent of ninety percent of the wide open area. This relationship is expressed by the equation:

$$A = A_{max} * (0.9)^N \quad (1)$$

where N is the aperture N-number, A is the effective area of the aperture for that N-number, and $A_{max}$ is the area of the wide open iris Each dose rate which is selectable by the operator on terminal 67 has an iris N-number associated with it to set the automatic brightness control loop for that dose rate. Initially, a theoretical, or default, N-number is calculated for at least the operator selectable dose rate, at which an exposure is to be made during the calibration process. This provides an approximation of the N-number, the final value of which will be set empirically by the calibration process. As will be described, the N-numbers for the remaining selectable dose rates will be calculated from the empirically set N-number for this dose rate. Therefore, for optimum computational accuracy, the calibration exposure dose rate should be near the middle of the range of selectable rates.

The default N-number values are derived from the system's theoretical iris aperture f-number for the defined dose rates as given by the equation:

$$f = K\sqrt{\frac{(TO * Sp * ER * CF * Ap * K1)}{I}} \quad (2)$$

where K is a dose calibration constant which initially equals one, TO is the transmission factor for the system optics expressed in terms of (Lumens/square foot)/foot-Lambert, Sp is the measured pickup tube sensitivity, ER is particular the dose rate for which the f-number is being calculated, CF is the image intensifier conversion factor, Ap is the illuminated area of the pickup tube target, I is the peak operating current of the pickup tube, and K1 is a combined measurement unit conversion factor. The f-numbers for the different dose rates are calculated at step 82.

The theoretical f-number for each of the selectable dose rates is then used to determine the default aperture N-number for each dose rate at step 83 using the equation:

$$N = \frac{2}{\ln(0.9)} * \ln\left(\frac{FL}{A_{max} * f}\right) \quad (3)$$

where $A_{max}$ is the maximum iris aperture diameter, f is the theoretical f-number from equation (2), and FL is the focal length of the video camera lens. The default N-numbers for each of the user selectable dose rates are stored in the memory of the exposure control circuit 66.

Once the default iris aperture N-number has been calculated from the component characteristics, a calibration exposure in the fluoroscopy operating mode can be performed. The use of a default aperture N-number provides an approximate value to use initially in the calibration process which determines the actual N-number value. Although the use of a default value shortens the calibration process, the remaining steps could be performed without first calculating the default N-number. During the calibration exposure, a filter is placed on the table 33 in place of the patient 32 shown in FIG. 1. This filter consists of a 5.72 cm thick sheet of Plexiglas (trademark of Rohm and Haas Company), a 0.1 cm thick sheet of aluminum, and an approximately 0.08 cm thick sheet of copper. The spacing between the X-ray tube anode 13 and the image intensifier 36 is set at a given calibration distance.

The system is then configured for the fluoroscopic mode and a dose rate chosen in the middle of the range of rates selectable by the operator. The exposure then is commenced at step 84 by the exposure control circuit 66 issuing a KV COMMAND and a FILAMENT COMMAND to the X-ray tube power supplies 22 and 17 respectively. These commands are determined by the automatic brightness control loop to achieve the proper image intensity at the fluoroscopic dose rate for the previously calculated default iris size. The grid supply 26 in the fluoroscopy mode receives a PULSE WIDTH COMMAND that instructs it to pulse the control grid 15 at the field rate of the video camera 46. The exposure control circuit 66 also sends the previously derived default N-number for the selected dose rate to the iris control 50. This opens the aperture of iris 48 to an initial size for the automatic brightness control loop. The exposure control circuit adjusts the filament current and anode-to-cathode voltage until the brightness control loop reaches a quiescent state.

Then, at step 85, the exposure control circuit 66 begins receiving photocathode current samples from the image intensifier power supply 40 and sampling circuit 41. The photocathode current is linearly related to the X-ray dose at the input of the image intensifier 36. Therefore, the photocathode current can be used as a measurement of the x-ray dose and averaged over time to determine the dose rate. The photocathode current is sampled five times per video camera field interval for ten video fields and the fifty samples thus obtained are averaged by the exposure control circuit 66.

The equivalent dose rate is then calculated at step 86 by the exposure control circuit 66 from the sample average using the following equation:

$$\text{Dose Rate} = \frac{Ip * K2}{Si} \quad (4)$$

where Ip is the average sampled photocathode current, K2 is a measurement unit conversion factor, and Si is the photocathode current gain for the specific image intensifier.

If the calculated equivalent dose rate is within a given tolerance range (e.g. ±5%) of the selected dose rate at step 87, the system is considered calibrated for that dose rate. If the calculated dose rate is outside the tolerance range, the exposure control circuit 66 issues a new N-number to the iris control circuit 50 at step 88. The new N-number changes the iris aperture size which causes the brightness control loop to increase or decrease actual dose rate toward the selected level. Specifically, the alteration of the iris aperture increases or decreases the average image brightness level detected by the averaging circuit 64 and the exposure control circuit 66 responses to the change in average image brightness by altering the X-ray tube excitation which correspondingly alters the dose rate. The process then returns to step 85. After the brightness control loop stabilizes again, another set of fifty photocathode current samples are averaged and a new equivalent dose rate is calculated. Eventually the N-number for the iris control will be adjusted to a value which causes the brightness control loop to generate an actual dose rate from the X-ray tube that is within the tolerance range of the selected dose rate. At this point that N-number is stored in the memory of the exposure control circuit 66 at step 89 as the value to use for that selected dose rate.

Although the fluoroscopy calibration procedure described above could be repeated for the remaining operator selectable dose rates, the N-numbers for those levels are calculated based on the calibration for the first selectable dose rate at step 90. This calculation employs the following equation:

$$N_{NDR} = N_{CDR} - \left( \frac{\log\left(\frac{NDR}{CDR}\right)}{\log(0.9)} \right) \quad (5)$$

where $N_{NDR}$ is the N-number being calculated for the next selectable dose rate, $N_{CDR}$ is the N-number for the first calibrated dose rate, CDR is the value of that first calibrated dose rate, NDR is the value of the next selectable dose rate for which the N-number is to be calculated. The calculated N-number for each operator selectable dose rate is stored in the memory of the exposure control circuit 66. Thereafter when the operator chooses one of these dose levels via terminal 67, the exposure control circuit retrieves the corresponding N-number from its memory and sends that number to the iris control 50.

After the X-ray system 10 has been calibrated for the fluoroscopic mode of operation, the exemplary system in FIG. 1 must be calibrated for the cinecamera mode. If a photospot camera is substituted for the cinecamera 46, a calibration procedure that is similar to the cinecamera mode must be performed for the photospot camera mode dose rates. As discussed previously when the system is in the cinecamera mode, the video camera 44 is not used to measure the brightness of the output image from the image intensifier 36. Instead the photodetector 52 and integrator 54 are employed to obtain an averaged image brightness sample. The integrator 54 is calibrated using a fluoroscopic mode exposure and the previously calibrated fluoroscopic mode dose rates.

The cinecamera mode dose rates are calibrated by determining the proper integrator circuit gain for this mode's selectable dose rates. The integrator 54 is calibrated at a fixed dose rate, for example 10 mR/minute which is near the middle of the range of dose rates selectable in the cinerecording mode. If this fixed dose rate does not equal one of the previously calibrated fluoroscopic dose rates, an iris aperture N-number for the desired fixed dose rate (e.g. 10 mR per minute) is calculated by the equation:

$$N_{int} = N_{FDR} - \left( \frac{\log\left(\frac{\text{Desired Dose Rate}}{\text{Fluoro Dose Rate}}\right)}{\log(0.9)} \right) \quad (6)$$

This equation is similar to equation (6), except the Desired Dose Rate is the one at which the integrator is to be calibrated, and the Fluoro Dose Rate is a previously calibrated fluoroscopic mode dose rate, $N_{int}$ is the N-number for the desired dose rate, $N_{FDR}$ is the N-number of the calibrated fluoroscopic dose rate. Once this equation is solved for $N_{int}$, that N-number is sent to the iris control 50 setting the iris aperture to the proper opening for the desired dose rate. Alternatively, one of the previously calibrated fluoroscopic dose rates, which is closest in value to the desired fixed dose rate may be used to calibrate the integrator 54.

At the outset of the cinecamera mode calibration, the X-ray system is operated in fluoroscopy mode to establish the desired dose rate, at step 92. After the system has stabilized, it is placed in the manual fluoroscopy mode in which the automatic brightness control is disabled to lock the X-ray tube excitation, and thereby the dose rate, at the desired calibration level at step 93. The multiplexer 58 then is switched to couple the output of the integrator 54 to the input of the exposure control circuit 66. The gain of the integrator 54 is varied by the exposure control circuit 66 until the integrator's output reaches a predefined level within a given time interval, at step 94. For example, the integrator gain is adjusted until its output reaches five volts in a two second period In this case, for a dose rate of 10 mR/minute, the integrator is now calibrated with a known gain that produces a 67 $\mu$R/volt integration rate.

Once the integration has been calibrated the gain for the initial dose rate (e.g. 10 mR/minute) is employed to derive the integrator gains for the other selectable dose rates of the cinecamera mode. This calculation assumes that the gain integrator transfer function is linear and passes through the origin, so that this single point calibration method may be used.

I claim:

1. A method of calibrating the dose of an X-ray imaging system having an X-ray tube with an anode, a cathode and a filament which tube is excited to emit X-rays; and having an image intensifier with a photocathode, said method comprising the steps of:
   - selecting a desired dose rate for an X-ray exposure;
   - producing an X-ray exposure from the system;
   - sensing the magnitude of an electrical current flowing through the photocathode;
   - deriving the actual X-ray exposure dose rate from the sensed magnitude of the photocathode current;
   - comparing the actual exposure dose rate to the selected desired dose rate; and
   - altering the excitation of the X-ray tube in response to the comparing step until the actual exposure dose rate substantially equals the selected desired dose rate.

2. The method as recited in claim 1 wherein the step of deriving the actual X-ray dose rate involves solving the equation: Dose=(Ip/Si), where Ip is the photocathode current, and Si is the photocathode current gain of the image intensifier.

3. The method as recited in claim 2 wherein the step of sensing the magnitude of an electrical current flowing through the photocathode involves averaging the sensed current over a given period of time and using the average as the value of Ip to derive the actual exposure dose rate.

4. The method as recited in claim 1 wherein the step of altering the excitation of the X-ray tube involves altering one or more of the parameters in the group consisting of an electric current through the filament, a voltage between the anode and the cathode, and a current flowing between the anode and the cathode.

5. A method of calibrating the dose of an X-ray imaging system having an X-ray tube, an image intensifier with a photocathode; a video camera which converts an image from the image intensifier to a video signal, and a control circuit which regulates the electrical excitation of the X-ray tube in response to a characteristic of the video signal, said method comprising the steps of:
   - producing an X-ray exposure from the system;
   - sensing the magnitude of an electrical current flowing through the photocathode;
   - deriving the actual X-ray dose rate from the sensed magnitude of the photocathode current;
   - comparing the actual dose rate to a desired dose rate; and
   - altering the excitation of the X-ray tube in response to the comparing step until the actual dose rate substantially equals the desired dose rate.

6. The method of calibrating the dose of an X-ray imaging system as recited in claim 5 wherein the step of altering the excitation of the X-ray tube comprises changing the size of an aperture of the video camera to control the amount of light entering the camera thereby causing the control circuit to change the excitation of the X-ray tube, said changing of the aperture continuing until the actual X-ray dose substantially equals the desired dose level.

7. The method of calibrating the dose of an X-ray imaging system as recited in claim 6 further comprising determining the size of the aperture for another dose rate from the size of the aperture when the actual X-ray dose substantially equals the desired dose rate.

8. The method as recited in claim 6 further comprising prior to producing the x-ray exposure, determining an initial size for the aperture of the video camera in response to the characteristics of components of the x-ray system.

9. The method as recited in claim 5 wherein the step of deriving the actual X-ray dose rate involves solving the equation: Dose=(Ip/Si), where Ip is the photocathode current, and Si is the photocathode current gain of the image intensifier.

10. A method of calibrating the dose of an X-ray imaging system having an X-ray tube, an image intensifier with a photocathode, a video camera which converts an image from the image intensifier to a video signal, a film camera for recording an image from the image intensifier, a photodetector which produces an output signal indicative of the brightness of the image from the image intensifier, means for integrating the photodetector output signal including a variable gain amplifying means, and a control circuit which regulates the electrical excitation of the X-ray tube; the X-ray imaging system being operable in either a fluoroscopic mode or a film camera mode; said method comprising the steps of:
   - (a) calibrating a first dose rate for the fluoroscopic mode by:
     - (1) producing a first X-ray exposure from the system;
     - (2) sensing the magnitude of an electrical current flowing through the photocathode;
     - (3) deriving the actual X-ray dose rate from the sensed magnitude of the photocathode current;
     - (4) comparing the actual dose rate to a desired dose rate;
     - (5) altering the excitation of the X-ray tube in response to the comparing step until the actual dose rate substantially equals the desired dose rate; and
     - (6)storing system data which define the excitation of the X-ray tube when the actual dose rate substantially equals the selected dose rate; and
   - (b) then calibrating the system for the film camera mode by:
     - (1) producing a second X-ray exposure in the fluoroscopic mode at a given dose rate derived from the previously calibrated first dose rate;
     - (2) when the system stabilizes at the given dose rate, maintaining the emission from the X-ray tube at a substantially constant level, and (3) adjusting the gain of the means for amplifying until the means for integrating produces a predefined output in a given interval of time.

11. The method as recited in claim 10 wherein the step of sensing the magnitude of an electrical current flowing through the photocathode averages the sensed current for a predefined interval.

12. The method as recited in claim 10 wherein the actual X-ray dose rate is derived according to the equation: Dose=(Ip/Si), where Ip is the photocathode current, and Si is the photocathode current gain of the image intensifier.

13. The method as recited in claim 12 wherein the step of sensing the magnitude of an electrical current flowing through the photocathode involves averaging the sensed current over a given period of time, and result of the averaging is used as the value of Ip to derive the actual dose rate.

14. The method as recited in claim 10 wherein the step of altering the excitation of the X-ray tube involves changing the size of an iris aperture for the video camera.

15. The method as recited in claim 14 wherein the step of producing a second X-ray exposure includes deriving an iris aperture size from an iris aperture size for the previously calibrated first dose rate.

16. The method as recited in claim 10 wherein calibrating the system for the film camera mode further comprises deriving a gain setting of the means for amplifying for a third dose rate from the gain setting for the second dose rate.

17. A method of calibrating the dose of an X-ray imaging system having an X-ray tube, an image intensifier with a photocathode, a video camera which converts an image from the image intensifier to a video signal, a film camera for recording an image from the image intensifier, a photodetector which produces an output signal indicative of the brightness of the image from the image intensifier, means for integrating the photodetector output signal, and a control circuit which regulates the electrical excitation of the X-ray tube, the X-ray imaging system being operable in either a fluoroscopic mode or a film camera mode; said method comprising the steps of:

(a) calibrating the system for a first dose level in the fluoroscopic mode by:

(1) producing a first X-ray exposure from the system, (2) detecting the actual X-ray dose level generated by the X-ray tube, (3) comparing the actual dose level to a desired dose level, (4) altering the excitation of the X-ray tube in response to the comparing step until the actual dose level substantially equals the desired dose level, and (5) storing system data which define the excitation of the X-ray tube when the actual dose level substantially equals the selected dose level; and (b) thereafter calibrating the system for the film camera mode by:

(1) producing a second X-ray exposure in the fluoroscopic mode at a given dose level derived from a previously calibrated dose level, (2) when the system stabilizes at the given dose level, maintaining the emission from the X-ray tube at a substantially constant level, (3) adjusting the means for integrating to produce a predefined output indicative of the given dose level, and (4) storing data representing the adjustment of the means for integrating which produced the predefined output indicative of the given dose level.

18. The method as recited in claim 17 wherein the step of detecting the actual X-ray dose level comprises:

sensing the magnitude of an electrical current flowing through the photocathode of the image intensifier; and deriving the actual X-ray dose level from the sensed magnitude of the photocathode current.

19. The method as recited in claim 17 further comprising calibrating the system for an additional dose level in the fluoroscopic mode by arithmetically deriving system data which define the excitation of the X-ray tube for that additional dose level from the system data which define the excitation of the X-ray tube for the first dose level; and storing the system data for the additional dose level.

20. The method as recited in claim 17 wherein calibrating the system for the film camera mode further comprises arithmetically deriving data representing an adjustment of the means for integrating for another dose level; and storing such data.

* * * * *